United States Patent [19]

Scheu

[11] Patent Number: 5,598,965

[45] Date of Patent: Feb. 4, 1997

[54] INTEGRATED CIRCUIT, ELECTRONIC COMPONENT CHIP REMOVAL AND REPLACEMENT SYSTEM

[76] Inventor: William E. Scheu, 97671 Overseas Hwy., Key Largo, Fla. 33037

[21] Appl. No.: 333,753

[22] Filed: Nov. 3, 1994

[51] Int. Cl.⁶ ..................................................... B23K 3/04
[52] U.S. Cl. .............................. 228/6.2; 228/9; 228/49.5; 269/903
[58] Field of Search .............................. 228/119, 180.22, 228/264, 6.2, 9, 44.7, 49.5; 269/71, 903; 219/85.16

[56] References Cited

U.S. PATENT DOCUMENTS

| | | | |
|---|---|---|---|
| 4,569,473 | 2/1986 | Guiliano | 228/264 |
| 4,659,004 | 4/1987 | Fridman | 228/6.2 |
| 4,752,025 | 6/1988 | Stach et al. | 228/49.5 |
| 4,767,047 | 8/1988 | Todd et al. | 228/6.2 |
| 4,799,617 | 1/1989 | Friedman | 228/264 |
| 4,832,249 | 5/1989 | Ehler | 228/9 |
| 5,340,011 | 8/1994 | Sanchez | 228/49.5 |

OTHER PUBLICATIONS

Surface Mount Technology, "How to Use Integral Vision and Reflow for Placement of fine Pitch SMCs", pp. 31,32, Feb. 1987.

*Primary Examiner*—Samuel M. Heinrich
*Attorney, Agent, or Firm*—Malloy & Malloy, P.A.

[57] ABSTRACT

A electronic chip removal and replacement system to be used to remove and replace a surface mounted or edge connected electronic chip from a circuit board, the system including a heater assembly having a heater unit which produces a quantity of heat, thereby heating an air flow which passes thereover to produce heated air which exits the heater assembly through an outlet nozzle. The hot air flow is applied to the electronic chip in a specific controlled pattern as directed through a microprocessor which directs a timed and ramped increase and decrease of a temperature of the heater unit in accordance with a specific type of chip being heated. Further, the microprocessor is structured such that it can be disengaged remotely whereby only the heater unit is shut down and not the remainder of the system including the air flow over the heater unit, thereby allowing the heater unit to cool down between uses and facilitating ramped up heating in accordance with a specific ramped heating profile corresponding the specific type of electronic chip being replaced or removed.

25 Claims, 1 Drawing Sheet

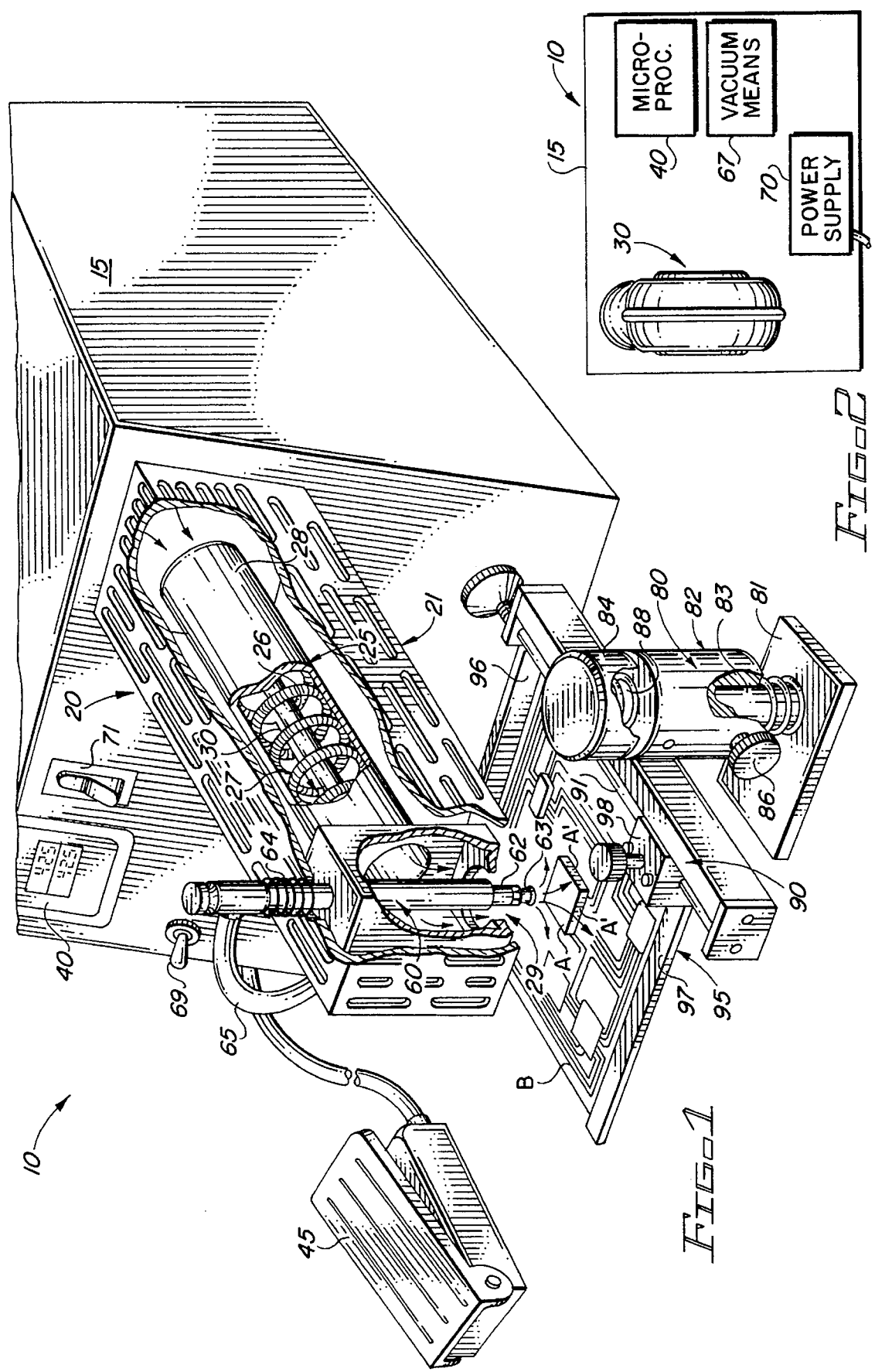

INTEGRATED CIRCUIT, ELECTRONIC COMPONENT CHIP REMOVAL AND REPLACEMENT SYSTEM

BACKGROUND OF THE INVENTION

1. Field of the Invention

The present invention relates to a electronic chip removal and replacement system utilized to remove and replace electronic chips from a circuit board without burning out the electronic chip and without requiring a large, substantially expensive rework station.

2. Description of the Related Art

Circuit boards used to provide computer control in varying devices will generally include integrated circuit, electronic component chips mounted thereon in order to provide the device with information processing ability. Depending upon the requirements or the advancement of the device, various different types of electronic chips are utilized on the device's circuit boards. Presently, the most common type of electronic chips employed includes a plurality of external contacts disposed about a perimeter thereof which are bonded/secured at or through the surface of the circuit board using a solder or conductive epoxy. Recently, however, through the advancement of technology, more advanced electronic chips, such as those known as Ompacs, BGA's (Ball Grid Arrays), and/or SGA's (Solder Grid Arrays) are becoming more widely employed. The primary characteristic of these types of electronic chips, and further electronic chips which are being developed to provide even greater capability, is the presence of a number of ball like connectors spaced along a lower surface of the electronic chip. Because these connectors are disposed under the surface of a placed electronic chip, they are not directly accessible or visible during removal and replacement and must be heated through and sometimes under the electronic chip body.

When the electronic chips are initially secured to the circuit board at a manufacturing site, heat energy is applied to soften the solder or conductive epoxy in order to secure the contacts to the circuit board. Generally, this task is performed in large oven-type devices and the temperature and heat energy is applied in a specific ramped profile to correspond the type of electronic chips being secured to the circuit board. Due, however, to the expense of acquiring and utilizing a large manufacturing oven, and due to the relatively high expense of producing an entire circuit board as compared with a single electronic chip on that circuit board, the practice of individual electronic chip removal and replacement is widely used. Through these procedures, a specific electronic chip which is damaged, has become outdated, or has otherwise malfunctioned, is removed for repair or discarding, and a functioning electronic chip is secured in its place. Accordingly, devices which can heat the connectors of the electronic chip to allow removal and replacement have been developed.

Presently, conventional devices which are utilized to repair and replace electronic chips are quite large and quite expensive requiring a business that wishes to perform such repair and replacement activities to truly be dedicated to that task and to have a substantial need in order to warrant the significant expenditure. As for smaller devices, these generally do not provide sufficient heat and function at constant heat and temperature levels making them extremely difficult and hazardous to work with because of the substantially high temperatures and large amounts of heat being supplied at all times.

Another significant drawback involved with known repair and replacement systems involves the risk of burning out a good chip during repair. Specifically, many conventional devices must focus the heat energy directly on the contacts disposed along the perimeter of the electronic chip in order to provide sufficient heat for removal and replacement without burning out the chip. Due to the high temperatures which must be maintained, in known devices, to provide sufficient heat to remove or replace the chip, there is a great risk that at those high temperatures, the electronic chip will burn out if the heat is not properly focused on the contacts. In addition to being difficult to employ and control when repairing conventional chips, such methods which focus the heat at the contacts are ineffective for use with the more modern electronic chips which employ the contacts along their bottom surface. In such cases, the heat must be directed through the electronic chip itself such that if the temperature is elevated too high at times in order to attain the required heat levels, there is a substantial risk of burning out the electronic chip being worked on or adjacent ships.

Accordingly, there is a substantial need in the art for a electronic chip removal and replacement system which can provide the equivalent ramped heating profiles as could be possible with large manufacturing ovens, while being substantially portable, safe, and easy to utilize. Most importantly, there is a need for such a device which can be produced and provided to a consumer at a substantially low cost as compared with devices known in the art, while also providing a device which recognizes the long felt and as yet unaddressed problem regarding electronic chip burnout during replacement and removal of not only the most commonly employed perimeter connector type chips, but also of the new, increasingly advanced types of electronic chips which do not have the perimeter connectors. The device of the present invention is designed specifically for and functions in recognition of the significant needs present in the art.

SUMMARY OF THE INVENTION

The present invention relates to a electronic chip removal and replacement system which is utilized in circuit board repair in order to remove and replace a electronic chip from the circuit board to be used in any of a varying type of technologies which employ electronic controls. Included as part of the removal and replacement system is a heater assembly. The heater assembly of the system includes a heater unit, air flow means, and an outlet nozzle. Specifically, the heater unit is structured to produce a quantity of heat for use in the removal and replacement of the electronic chip. The airflow means are structured to pass air over the heater such that the air will be heated providing heated air for use in the removal and replacement. Finally, at an outlet nozzle of the heater assembly, the heated air is directed out from the heater assembly where it can be used to remove and/or replace the electronic chip.

Also included as part of the removal and replacement system are control means. The control means which include a microprocessor and a remote microprocessor switching means are structured to regulate and control the hot air flow exiting the outlet nozzle of the heater assembly. Turning to the microprocessor, it works in conjunction with a thermocouple and is structured to direct a timed or ramped increase or decrease of a temperature of the heater unit. The ramped increase or decrease corresponds the manufacturing heating conditions of a specific type of chip being heated such that the quantities of heat necessary to remove and/or replace the electronic chip are applied in a similar manner as the ramped heating applied in the original manufacture of the circuit board.

The remote microprocessor switching means of the control means are designed to engage and disengage the microprocessor. When engaged, the heater unit is regulated by the microprocessor and will produce the needed quantity of heat. When disengaged, no additional heat will be produced by the heater unit but the system, including the air flow means, remain operational. This allows the heater unit to cool down until additional heat is required for the removal or replacement of another electronic chip and the ramped heating is reinitiated.

In order to place the circuit board in appropriate positioning beneath the outlet nozzle of the heater assembly, a circuit board positioning assembly is included. This circuit board positioning assembly holds the circuit board and allows for movement of the circuit board into the appropriate chip removal and replacement position beneath the outlet nozzle.

Finally, power supply means are provided to supply heat producing power to the heater assembly. The power supply means are structured such that the heater unit will produce substantially large quantities of heat at a relatively low chip removal temperature. This will minimize the risk that the electronic chip will burn out due to high temperatures, while providing sufficient heat energy to secure or remove the electronic chip.

It is an object of the present invention to provide a electronic chip removal and replacement system which can provide sufficient heat at the connectors of the electronic chip to secure or detach the electronic chip to the circuit board, while minimizing the risk of burning out the electronic chip even if the connectors on the electronic chip are located on a concealed or lower surface of the electronic chip which necessitates that the heat pass through the electronic chip in order to effect the connectors.

Still another object of the present invention is to provide a electronic chip removal and replacement system which can provide sufficient heat to effectively remove and replace electronic chips of varying types, including advanced types being developed, which is not substantially expensive, and which is substantially portable and convenient to utilize.

Yet another object of the present invention is to provide a electronic chip removal and replacement system which can provide heat according to ramped heating profiles which approximate the ramped heating profiles utilized in initial manufacturing of the circuit board bearing the electronic chip.

A further object of the present invention is to provide a chip removal and replacement system which is substantially easy to use and relatively safe to operate because of the ability to selectively cut off heat being supplied by the system, while the system including the air flow means remains operational.

An additional object of the present invention is to provide a electronic chip removal and replacement system which can enable a ramped heating profile to be used to remove a electronic chip, to be stored and utilized during replacement of that electronic chip or a similar type of electronic chip.

Still another object of the present invention is to provide a chip removal and replacement system having a circuit board positioning assembly which can effectively and efficiently position the circuit board in relation to a heater assembly and in particular, which can provide for an effective initial placement and removal of the circuit board from beneath the outlet nozzle of the heater assembly, while simultaneously maintaining an appropriate vertical positioning of the circuit board both before and after its placement beneath the outlet nozzle.

Another object of the present invention is to provide a electronic chip removal and replacement system which is substantially portable and compact and does not require a substantially large, expensive, and complex work station.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the electronic chip removal and replacement system.

FIG. 2 is a rear schematic view of the system.

Like reference numerals refer to like parts throughout the several views of the drawings.

DETAILED DESCRIPTION OF THE PREFERRED EMBODIMENT

As shown throughout the figures, the present invention is directed towards an integrated circuit, electronic component removal and replacement system, generally indicated as 10. Specifically, the system 10 will be utilized to remove a electronic chip A from its secured, bonded position on a circuit board B, and to replace a electronic chip A in its bonded, secured orientation atop a circuit board B.

Electronic chips A are designed in varying designs, all of which must include connectors at which the electronic chip A is conductively secured to the circuit board B. Generally, the electronic chip A will be secured to the circuit board B utilizing a metal solder material or utilizing a conductive epoxy, both of which will soften when subjected to sufficient heat and will reharden to form an effective, conductive bond once the heat is removed. In this regard, the most commonly used type of electronic chips A have a plurality of connectors A' disposed along opposite sides thereof or disposed about a perimeter thereof at which the chip A will be secured in place. With the advancement of technology and the development of more sophisticated electronic chips A, such as those known as Ompacs, BGA's and SGA's, however, the connectors are more commonly being structured as an array of solder balls disposed along a bottom surface of the chip. When installing one of the advanced chips, the chip is placed atop an appropriate location on the circuit board B and surface tension of the solder during heating, for either initial mounting or replacement, aligns the electronic chip A into appropriate positioning. Accordingly, in most types of chips A, removal is achieved by applying a substantial quantity of heat at the connectors and separating the electronic chip A from the circuit board B, and replacement is achieved by applying heat to the connectors of a electronic chip A, which has been placed in aligned orientation atop the circuit board B, until the electronic chip A is bonded in place.

Included as part of the electronic chip removal and replacement system 10 of the present invention is a heater assembly, generally indicated as 20. The heater assembly 20 includes principally a heater unit 25 which is structured and disposed to produce a substantially high quantity of heat for removal and replacement of the electronic chip A. The heater unit 25 will preferably be primarily contained within a heater arm 21 which extends from a main housing of the system 10 such that it can more easily overhang a positioned circuit board B. This preferably elongate heater arm 21 contains the heater unit 25 which will include a main heater rod 26 surrounded by a heating coil 27, and which is capable of producing heat at temperatures of up to approximately 1,000° Fahrenheit. Surrounding the heater unit 25 is a preferably tubular shield 28 which shields an exterior of the system 10 from a portion of the heat being emanated by the heater unit 25. Further, the shield 28 will direct and contain air flow passage therethrough over the heater unit 25.

The air flow used in the heater assembly 20 is produced by air flow means 30 which produce air and pass it over the heater unit in order to produce heated air. Preferably, the air flow means 30 include an air blower located preferably within the housing 15 of the system 10. The air blower 30, which can be any conventional type of air blower such as those utilized in a hairdryer, pushes the air through the shield 28 such that it passes over the heater unit 25 and becomes substantially heated.

Disposed in an opposite end of the shield 28 from the air blower 30 is the outlet nozzle 29. This outlet nozzle 29, which is also part of the heater assembly 20, directs air out from the heater assembly 20, preferably at a distal end of the heater arm 21, in a downward direction. During removal and replacement of the electronic chip A, the outlet nozzle 29 is structured to be positioned over and preferably substantially surround the entire electronic chip A so as to direct a consistent heated air flow over an entire surface of the electronic chip A and not just a connector portion thereof. Also, the outlet nozzle 29 can be removable such that an outlet nozzle having a different size or configuration can be secured at a distal end of the heater arm 21 if a electronic chip A of a varying size or configuration must be removed or replaced.

Although the heater unit 25 of the heater assembly 20 is capable of obtaining temperatures of approximately 1,000° Fahrenheit, the optimal functioning temperature of the heater unit 25 in order to minimize the risk of burning out a chip A being removed or replaced is approximately 400° F. Accordingly, the system 10 is equipped with power supply means 70, preferably disposed within the housing 15, which are capable of supplying sufficient power to the heater unit 25 such that substantially large and sufficient quantities of heat will be produced by the heater unit 25 for removal and replacement of the electronic chip A, while maintaining a temperature attained by the heater unit 25 at approximately 400° F. at its peak level. In the preferred embodiment, the power supply means 70 are specifically structured to provide approximately 1200 watts of power for use by the heater unit 25. As such, the hot air can be blown over an entire surface of the electronic chip, which is especially necessary with the more advanced types of electronic chips having the concealed connectors, without risk of burning out the contents of the electronic chip in the process of removing and replacing.

In order to regulate and control the hot air flow exiting the outlet nozzle 29 of the heater assembly 20, control means are included. Included as part of the control means is a main power switch 71 of the system 10, which turns the system 10 completely on and completely off, and a remote microprocessor switching means. The remote microprocessor switching means, which can be in any conventional switching form such as a toggle switch, an air switch, or a remote switch, will preferably be in the form of a foot pedal type switch 45 which can be conveniently positioned for actuation by a user. This remote microprocessor switching means 45 is specifically structured to engage and disengage a microprocessor 40 also included as part of the control means. When the microprocessor 25 is engaged as a result of a turning on of the remote microprocessor switching means 45, and in the case of the foot pedal by pushing down upon the foot pedal, the microprocessor 40 will function to allow the heater unit 25 to produce regulated quantities of heat. When the remote microprocessor switching means 45 are in an off position, however, the microprocessor 40 will not be engaged and will therefore not allow the heater unit 25 to produce any additional heat. Specifically, when the microprocessor 40 is disengaged utilizing the remote microprocessor switching means 45, only the heater unit 25 of the heater assembly 20 will be shut down. Accordingly, the air blower 30 will continue to blow air over the heater unit 25 functioning to cool down the heater unit 25 until it is re-engaged and can ramp up to the appropriate heat production levels.

The microprocessor 40 of the control means, which can be a personal computer, or any temperature process control, exteriorly connected to the system 10 and/or various external metering devices, will preferably be mounted directly in the housing 15 of the system 10 and will be accordingly built in to the system 10. This microprocessor 40 with the use of a digital timer and sensitive thermocouple will direct timed and ramped increases and decreases of a temperature of the heater unit so as to provide the necessary heat energy required to remove and replace the electronic chip A. Specifically, the thermocouple will cause the heater unit 25 to shut down if the heat or temperature conditions exceed the requirements set by the microprocessor 40. The ramped increases and decreases directed by the microprocessor 40 will correspond a specific type of chip which is being heated, the amount of the ramped increase and decrease preferably being defined by a ramped heating profile which has been predetermined to correspond the specific type of electronic chip A being heated. Generally, when electronic chips A are initially secured to a circuit board B during manufacturing, the electronic chip A and circuit board B are not placed directly into a high heat level. Rather, the heat levels are ramped up and down based upon a specific ramped heating profile corresponding the specific type of electronic chips A being heated. This ramped profile takes the heat levels from ambient, or an intermediate level to which the heater has cooled down, up to the optimal removal or replacement heat levels, and back down to lower heat levels. Accordingly, in the preferred embodiment, the microprocessor 40 can have a plurality of stored ramped heating profiles corresponding a number of differing, commonly used electronic chips A which are to be removed or replaced.

In addition to the pre-programmed ramped heating profiles, or instead of those profiles, additional ramped heating profiles can be downloaded into the microprocessor 40, individually programmed into the microprocessor 40, or determined upon removal of a particular electronic chip A. Specifically, determination of an optimal ramped heating profile corresponding a specific type of electronic chip A may have to be determined from the removal of a particular electronic chip both due to the use and further development of various different types of electronic chips and due to the frequent inconsistencies between individual electronic chips of the same type which may require precision fine-tuning of the ramped heating profile utilized. In these cases, the specific ramped heating profile corresponding the particular chip being removed is determined through removal/replacement time and temperature detection means which identify, and transmit for storage to the microprocessor 40, the specific temperature of the heater unit 25 and the amount of time at which the heater unit 25 is at that specific temperature during the removal process, until the particular electronic chip A is finally separated from the circuit board B.

The removal/replacement time and temperature detection means will include a temperature meter, such as through the sensitive thermocouple, and the digital timer, which measure and store information regarding the ramped heating profile of the particular chip being removed as defined by the temperature of the heater unit at specific times, an amount of time at which the heater unit 25 is at that specific temperature, and the heat output at the point of separation of the particular electronic chip from the circuit board. Therefore, during use, the ramped heating profile corresponding a particular electronic chip being removed can be stored to the microprocessor 40, the final, completed definition of the ramped heating profile being signalled upon separation of the electronic chip A from the circuit board B.

In order to indicate separation of the electronic chip A from the circuit board B, means to indicate this separation are provided. Although these means to indicate separation could be directly connected with the microprocessor 40 so as to directly inform the microprocessor 40 that separation has occurred, the means will preferably be a visible indicator which can be viewed by a user of the system 10 so as to inform them that they should switch the remote microprocessor switching means 45 to disengage the microprocessor 40 and thereby signal that the removal heat has been attained.

In the preferred embodiment, the means to indicate separation of the electronic chip A from the circuit board B will preferably be in the form of a chip holding member 60. The chip holding member 60 is structured and disposed to hold the electronic chip A during its removal from the circuit board B such that when sufficient heat to allow for separation has been attained, the separation will in fact occur. In the preferred embodiment, the chip holding member 60 will include vacuum means 67 and a suction arm 62 connected in vacuum receiving coupling with the vacuum means 67. Preferably, the vacuum means 67 will be situated within the housing 15 of the system and connected through an elongate vacuum tube 65 with the suction arm 62. This suction arm 62, which will preferably be substantially elongate extends out through a middle of the outlet nozzle 29 of the heater assembly 20 such that positioning of the outlet nozzle 29 in covering relation over the electronic chip A will not be hindered by the suction arm 62, and such that heating of the entire electronic chip A will not be hindered. The suction arm 62, which is constructed so as to withstand substantially high quantities of heat, includes a suction head 63 disposed at a distalmost end thereof to protrude from the heater arm 21 at the outlet nozzle 29. The suction head 63 is structured such that during removal of a electronic chip A from the circuit board B, the suction head 63 will contact a top face of the electronic chip A and be secured thereto as a result of the vacuum provided by the vacuum means 67. The vacuum means 67 can include a switching mechanism 69 which is provided to engage and disengage the suction at the suction head 63. During removal of a electronic chip A from the circuit board B, the suction will be engaged and accordingly the suction head 63 will be secured to the top face of the electronic chip A. Also included in the suction arm 62 are engageable biasing means, preferably in the form of a spring 64. This spring 64 which must be formed of a material capable of withstanding substantially high quantities of heat without binding, can be engaged or disengaged and when in use, will function to normally bias the suction arm upwardly into the outlet nozzle 29 and heater arm 21. Accordingly, during use to remove the electronic chip A, the spring 64 will be counter-biased and held in that manner due to the suction securing of the suction head 63 atop the electronic chip A.

Once the heat levels are sufficient such that the electronic chip A can separate from the circuit board B, the tension from the spring 64 will result in the suction arm 62, which is holding the electronic chip A, to spring upwardly completely separating the electronic chip A from the circuit board B and allowing facilitated removal of the circuit board B and retrieval of the electronic chip A. Further, this upward springing, biased movement of the suction arm 62 will function as the means to indicate that the electronic chip A has been separated from the circuit board B, thereby indicating to a user that the heater unit should be disengaged. Alternatively, this upward biased movement can be connected to trigger a switching mechanism eliminating the need to rely upon the user's recognition.

The main housing 15 of the system 10, which includes the heater assembly 20, microprocessor 40, vacuum means 67, and power supply means 70, is constructed to be substantially portable and lightweight such that it can be easily transported to a location at which it will be used and can be used on a variety of work stations or work tables without requiring a specialized facility beyond an electrical source for connection with the power supply means 70.

In order to properly position the circuit board B and electronic chip A beneath the outlet nozzle 29 of the heater assembly 20, the system 10 of the present invention also includes a circuit board positioning assembly, generally indicated as 80. This circuit board positioning assembly 80 is structured to enable proper alignment and facilitated orientation of the circuit board beneath the outlet nozzle 29, thereby minimizing the risk to a user during positioning and providing appropriate alignment to ensure that heat is applied to the electronic chip A in an effective and even manner. Specifically, the circuit board positioning assembly 80 includes a base 81 which provides a balanced support surface for the circuit board positioning assembly 80. Extending upwardly from the base 81 is a vertical support 82. This vertical support 82 will preferably be adjustably and supportably held atop a support rod 83, which extends from the base 81. Secured to the vertical support 82 is a first arm 90, which is preferably located near an upper end of the support 82. The first arm 90 is structured and disposed to move vertically with the movement of the vertical support 82 so as to be secured in a specific vertical position above the base 81. In the preferred embodiment, the support shaft 83 will be threaded, notched, or will otherwise include adjustment means which will enable the vertical support 82 to be raised and lowered into a desired position. Once the vertical support 82, and hence the first arm 90 are positioned in that specific vertical position above the base 81, the vertical support 82 is secured in place, preferably by an externally accessible screw 86 or other adjustable securing means which can maintain the vertical support 82 elevated in the specific vertical position above the base 81.

Secured to the first arm 90 is an adjustable clamp arm 95 which is structured to securely hold the circuit board B therein. In the preferred embodiment, the adjustable clamp arm 95 includes a pair of opposite clamp members 96 and 97, one or both of which can be adjustably moved to enable the adjustable clamp arm 95 to be effectively secured about circuit boards B of varying sizes and dimensions. In preferred embodiment, the first arm 90 will include a guide bar 91 to which one of the clamp members 97 can be adjustably and slidably secured by a mount bracket 98. Preferably, the mount bracket 98 will slide over the guide bar 91 enabling the clamp member 97 to slide laterally into clamping position about the circuit board B. Once the circuit board B is securely positioned between the fixed clamp member 96 and the adjustable clamp member 97, tightening means on the mount bracket 98 can be secured to maintain the circuit board B in appropriate positioning.

Preferably, when positioning the electronic chip A and circuit board B beneath the outlet nozzle 29, the outlet nozzle 29 should completely surround the chip A and in fact be lowered beyond a top face of the chip A. This, however, can be difficult and dangerous due to the height of various other components on the circuit board B, and because if the circuit board B is moved into place while already positioned at the appropriate removal or replacement height, an edge of the placed chip A would abut the outlet nozzle 29. Accordingly, and because of the difficulty of safely and appropriately adjusting a height level of the circuit board B after the electronic chip A is aligned beneath the outlet nozzle 29, the circuit board positioning assembly 80 includes a temporary vertical adjustment assembly which can enable a user to temporarily lower the first arm 90, and accordingly the circuit board B, thereby allowing the circuit board and electronic chip to slide under the outlet nozzle 29 and be subsequently returned to a preset specific vertical position above the base 81. In the preferred embodiment, the temporary vertical adjustment assembly will include a piston 84 disposed on the vertical support 82 and secured to the first arm 90. Specifically, the piston 84 will include an internal spring 88 such that when a top of the piston 84 is pushed downward, the spring 88 will compress allowing the piston 84 to move downwardly to slightly lower the first arm 90 and accordingly the circuit board B. Once the circuit board B and electronic chip A are properly positioned, the piston 84 is released and the spring 88 will result in the first arm 90 returning to its previously set vertical position above the base 81. In an alternative embodiment, the piston 84 in addition to providing vertical adjustment can rotate about the central shaft 83, thereby providing further adjustment capabilities for the positioning of the circuit board B.

Now that the invention has been described,
What is claimed is:

1. To remove and replace an electronic chip from a circuit board, an electronic chip removal and replacement system comprising:
   (a) a heater assembly, said heater assembly including:
      (i) a heater unit structured and disposed to produce a quantity of heat,
      (ii) airflow means structured and disposed to pass air over said heater unit so as to produce heated air, and
      (iii) an outlet nozzle structured and disposed to direct said heated air out from said heater assembly;
   (b) control means structured and disposed to regulate and control hot airflow exiting said outlet nozzle of said heater assembly, said control means including:
      (i) a microprocessor structured to direct a timed and/or ramped increase and decrease of a temperature of said heater unit, said ramped increase and decrease corresponding a specific type of electronic chip being heated,
      (ii) removal/replacement time and temperature detection means structured and disposed to identify and transmit for storage to said microprocessor, a temperature of said heater unit and an amount of time at which said heater unit is at that specific temperature until separation of a particular electronic chip from the circuit board, the temperature of said heater unit and the amount of time at which the heater unit is at that specific temperature until separation of the particular electronic chip from the circuit board defining a ramp heating profile corresponding the particular electronic chip being removed or replaced, said ramp heating profile corresponding the particular electronic chip being stored for future retrieval and correlation during replacement of the particular electronic chip and removal and replacement of said specific types of electronic chips which are comparable to the particular electronic chip,
      (iii) remote microprocessor switching means structured and disposed to engage and disengage said microprocessor, said microprocessor when engaged directing said heater unit to produce said quantity of heat and when disengaged shutting down said heater unit such that it will not produce said quantity of heat; and
   (c) power supply means structured and disposed to provide heat producing power to said heater assembly.

2. A system as recited in claim 1 wherein said power supply means provide sufficient power to said heater unit so as to provide a substantial quantity of heat at a relatively low chip removal temperature, thereby minimizing a risk of burning out the electronic chip during removal and replacement.

3. A system as recited in claim 2 wherein said power supply means provide approximately 1200 watts of power.

4. A system as recited in claim 1 including a heater arm containing said heater assembly and structured to extend over the circuit board during removal and replacement of the electronic chip.

5. A system as recited in claim 4 wherein said air flow means includes an air blower structured and disposed to direct air through said heater arm and over said heater unit.

6. A system as recited in claim 5 wherein said air blower directs air through said heater arm and over said heater unit even when said heater unit is disengaged by said heater unit switching mechanism.

7. A system as recited in claim 1 wherein said microprocessor is structured to store a plurality of said ramp heating profiles corresponding a plurality of said specific types of electronic chips being removed and replaced.

8. A system as recited in claim 1 wherein said removal/replacement time and temperature detection means includes a temperature meter and a timer structured and disposed to measure the temperature of said heater unit and the amount of time at which the heater unit is at that specific temperature, until separation of the particular chip from the circuit board is indicated, for transmittal to and storage by said microprocessor.

9. A system as recited in claim 8 wherein said removal/replacement time and temperature detection means further includes means in said chip holding member to indicate separation of the particular electronic chip being removed from the circuit board.

10. A system as recited in claim 1 further including a chip holding member structured and disposed to hold the electronic chip during removal of the chip from the circuit board.

11. A system as recited in claim 10 wherein said chip holding member includes vacuum means and a suction arm connected in vacuum receiving coupling therewith, said suction arm being disposed at said outlet nozzle of said heater assembly and being structured to withstand substantially high quantities of heat, said suction arm further including a suction head which contacts a top face of the electronic chip and is secured thereto during functioning of said vacuum means such that upon separation of the electronic chip from the circuit board during removal the electronic chip will remain secured to said suction head.

12. A system as recited in claim 11 wherein said suction arm includes engageable biasing means structured to withstand substantially high quantities of heat without binding and which when engaged are structured and disposed to normally bias said suction arm into said outlet nozzle such that upon separation of the electronic chip from the circuit board said suction arm and the electronic chip secured thereto will be urged upwardly towards said outlet nozzle and away from the circuit board.

13. A system as recited in claim 12 wherein upward biased movement of said suction arm is structured to indicate that the electronic chip has been separated from the circuit board.

14. A system as recited in claim 1 which is substantially compact and portable.

15. A system as recited in claim 1 further including a circuit board positioning assembly structured to hold the circuit board and position the circuit board in chip removal and replacement position beneath said outlet nozzle of said heater assembly.

16. A system as recited in claim 15 wherein said circuit board positioning assembly comprises:
 a base,
 a vertical support extending upwardly from said base,
 a first arm secured to said vertical support and structured and disposed to move vertically and be secured in a specific vertical position above said base, and
 an adjustable clamp arm secured to said first arm and structured and disposed to securely hold the circuit board therein.

17. A system as recited in claim 16 wherein said circuit board positioning assembly further includes a temporary vertical adjustment assembly structured and disposed to temporarily lower said first arm from the specific vertical position above said base and to subsequently return said first arm to the specific vertical position above said base, so as to allow removal from and positioning of the circuit board beneath said outlet nozzle of said heater assembly.

18. A system as recited in claim 17 wherein said temporary vertical adjustment assembly includes a piston disposed on said vertical support and secured to said first arm.

19. A system as recited in claim 1 wherein said outlet nozzle is structured to substantially surround said electronic chip and direct said heated air over an entire exposed surface thereof.

20. A system as recited in claim 19 wherein said outlet nozzle is removable and replaceable.

21. An electronic chip removal and replacement system for removing and replacing an electronic chip from a circuit board, the electronic chip requiring that a predetermined quantity of heat energy be applied thereto at a substantially constant operating temperature in order to remove the electronic chip from the circuit board and/or replace the electronic chip from the circuit board; said electronic chip removal and replacement system comprising:
 (a) a heater assembly, said heater assembly including:
  (i) a heater unit structured and disposed to produce a quantity of heat,
  (ii) airflow means structured and disposed to pass air over said heater unit so as to produce heated air, and
  (iii) an outlet nozzle structured and disposed to direct said heated air out from said heater assembly and thereby apply a quantity of heat energy over the electronic chip;
 (b) control means structured and disposed to regulate and control hot airflow exiting said outlet nozzle of said heater assembly so as to set and maintain the substantially constant operating temperature,
 (c) a microprocessor structured and disposed to be programmed to automatically direct a timed increase and decrease of a temperature at which the heat is being produced by said heater assembly to and from the substantially constant operating temperature, said timed increase and decrease of said temperature corresponding a specific type of electronic chip being heated, and
 (d) power supply means structured and disposed to provide heat producing power to said heater assembly.

22. To remove and replace an electronic chip from a circuit board, an electronic chip removal and replacement system comprising:
 (a) a heater assembly, said heater assembly including:
  (i) a heater unit structured and disposed to produce a quantity of heat,
  (ii) airflow means structured and disposed to pass air over said heater unit so as to produce heated air, and
  (iii) an outlet nozzle structured and disposed to direct said heated air out from said heater assembly over the electronic chip;
 (b) control means structured and disposed to regulate and control hot airflow exiting said outlet nozzle of said heater assembly,
 (c) a microprocessor structured to be programmed to automatically control a rate at which a heat producing temperature of said heater assembly increases and decreases, said rate corresponding a particular type of electronic chip being heated, and
 (d) power supply means structured and disposed to provide heat producing power to said heater assembly.

23. To remove and replace an electronic chip from a circuit board, an electronic chip removal and replacement system comprising:
 (a) a heater assembly, said heater assembly including:
  (i) a heater unit structured and disposed to produce a quantity of heat,
  (ii) airflow means structured and disposed to pass air over said heater unit so as to produce heated air, and
  (iii) an outlet nozzle structured and disposed to direct said heated air out from said heater assembly to the electronic chip;
 (b) control means structured and disposed to regulate and control the amount of heat being applied by said heater assembly and a removal temperature at which the heat is applied, and
 (c) power supplying means structured and disposed to supply a quantity of heat producing power to said heater assembly, said quantity of heat producing power being sufficient to enable said heater assembly to produce substantially large quantities of heat at a relatively low chip removal temperature, thereby substantially eliminating a risk of damaging the electronic chip and adjacent components during removal and replacement.

24. An electronic chip removal and replacement system as recited in claim 23 wherein the electronic chip is a ball grid array type chip wherein the contacts are disposed on an underside of the electronic chip.

25. An electronic chip removal and replacement system as recited in claim 23 wherein said power supply means provide approximately 1200 watts of power.

* * * * *